July 3, 1945.      R. F. WYER      2,379,774
CONTROL APPARATUS
Filed Jan. 2, 1943      2 Sheets-Sheet 1
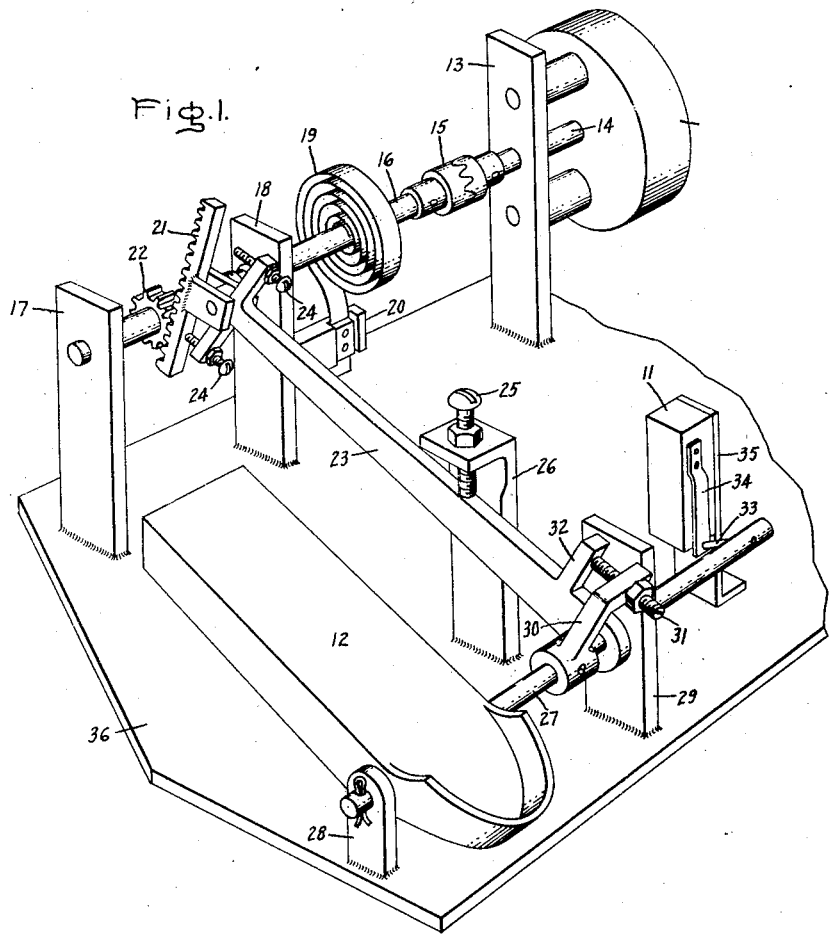
Fig.1.
Fig.2.
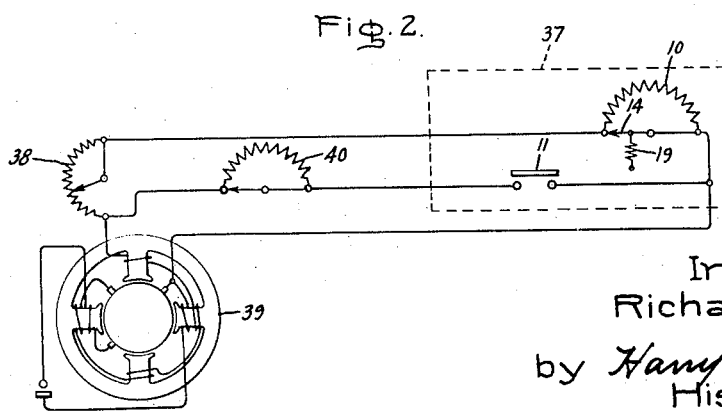
Inventor:
Richard F. Wyer,
by Harry E. Dunham
His Attorney.

July 3, 1945. R. F. WYER 2,379,774
CONTROL APPARATUS
Filed Jan. 2, 1943 2 Sheets-Sheet 2
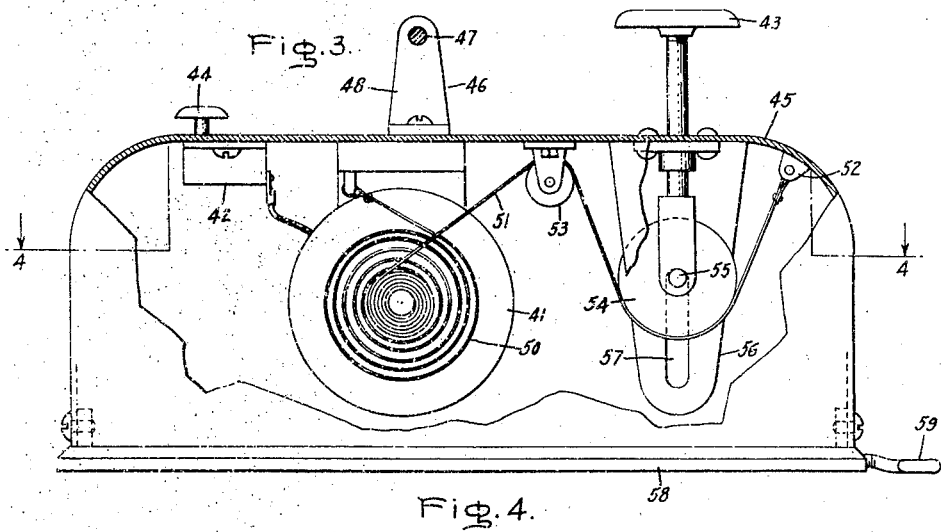
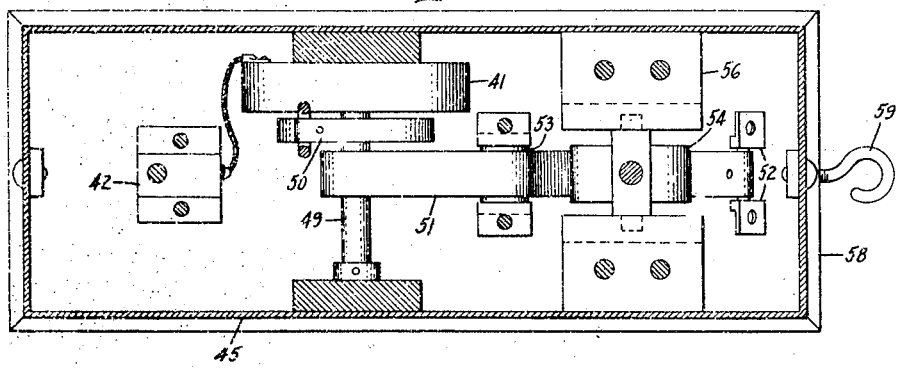
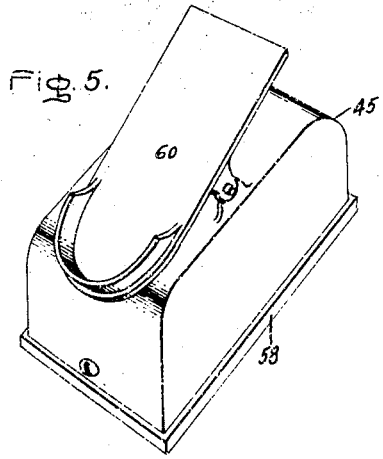
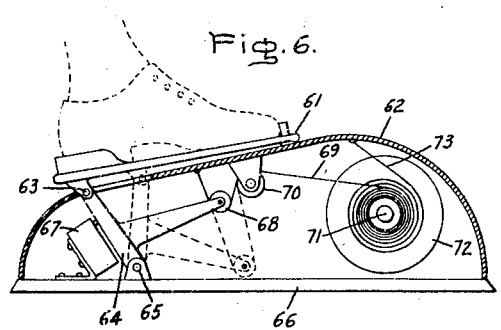
Inventor:
Richard F. Wyer,
by Harry E. Dunham
His Attorney.

Patented July 3, 1945

2,379,774

UNITED STATES PATENT OFFICE 2,379,774

CONTROL APPARATUS

Richard F. Wyer, Rexford, N. Y., assignor to General Electric Company, a corporation of New York Application January 2, 1943, Serial No. 471,171

15 Claims. (Cl. 201—48)

My invention relates to control apparatus for dynamo-electric machines and more particularly to foot operated controllers embodying an electric circuit, an adjustable impedance, and a switch interconnected with one another and one or more other impedances.

In arc welding thin material, such as thin walled tubing, it is necessary to increase or decrease the heat or current setting of the arc welding generator to accommodate abnormal conditions at the beginning or end of a weld or during welding. For example, when welding thin material where the normal welding heats are low and the base material and the electrode are cold, penetration at the beginning of a weld is likely to be poor with consequent piling up of deposited metal. A similar circumstance arises where the section to be welded suddenly becomes thicker or where it is necessary to weld through or across a previously deposited bead of weld metal. In either of these cases, it is desirable to increase the welding current in order to obtain adequate fusion of the weld and base material. On the other hand, it is desirable to reduce the welding current and heat in order to prevent burn-through in places where the fit-up is poor or where thin sections of base material are encountered. Furthermore, a tapering off of the welding current at the end of a bead is desirable in order to fill the arc crater which is otherwise left at the end of a bed. Such craters have proved very objectionable because they seem to be the seat of cracks and inclusions which are harmful to the strength of a weld, particularly its fatigue resistance.

It is an object of my invention to provide apparatus which when connected in the exciting circuit of a dynamo-electric machine may be used for rapidly increasing the current output of the machine or for decreasing it at will to desired values less than the normal value for which it has been adjusted.

It is another object of my invention to provide apparatus comprising an adjustable impedance and a switch interconnected with one another in an electric circuit and means for selectively operating said impedance and switch in response to the movement of an operating member movable in zones extending in opposite directions from a predetermined position to which said operating member is biased.

It is a further object of my invention to provide a controller having an operating member supported for movement in zones extending in opposite directions from a predetermined position, the arrangement being such that movement of the operating member in one of said zones adjusts the value of one of two series connected impedances and such that movement of said operating member in the other of said zones closes a switch which is connected in series with another adjustable impedance in shunt circuit across said series connected impedances.

It is also an object of my invention to provide for a dynamo-electric machine, foot operated controllers embodying an adjustable field rheostat and a field forcing switch connected in shunt thereto.

Further objects of my invention will become apparent from a consideration of the apparatus and its connection in the exciting circuit of a dynamo-electric machine illustrated in the accompanying drawings.

Fig. 1 of these drawings is a perspective view of a foot operated controller constructed in accordance with my invention; Fig. 2 is a wiring diagram illustrating its connection in the exciting circuit of an arc welding generator; Figs. 3 and 4 are side and top views partly in section illustrating the construction of another foot operated controller embodying my invention; Fig. 5 is a perspective view of a modification of the controller illustrated in Figs. 3 and 4; and Fig. 6 is a side view partly in section of still another foot operated controller embodying my invention.

In the controllers illustrated in the drawings an operating member, biased to a predetermined position, selectively controls either an adjustable impedance connected in an excitation control circuit of a dynamo-electric machine, or a switch controlling the connection of said impedance in said control circuit in response to its movements on either side of a said predetermined position in which it is inoperative for actuating either said impedance or said switch. These controllers are connected with one or more fixed or adjustable impedances in an excitation control circuit of a dynamo-electric machine as will be described below.

In the controller illustrated in Fig. 1 the adjustable impedance 10 and the switch 11 are selectively operated by a pedal 12 which is adapted to receive and support the foot of an operator. Adjustable impedance 10 may be a rheostat, one member of which is attached to a support 13 and the other member of which is mounted on and rotates with a shaft 14. One end of this shaft which projects through and is journaled in support 13, is connected by a flexible coupling 15 to the adjacent end of an operating shaft 16. This shaft is journaled in supports 17 and 18 for rotation about its longitudinal axis and the longitudinal axis of shaft 14 of rheostat 10.

Shaft 16 is biased for rotation in one direction by a coil spring 19 having one end attached thereto and the other end attached to a support 20 mounted on support 18. Rotational movement is imparted to shaft 16 by a rack and pinion 21 and 22. The pinion is mounted on the portion of shaft 16 between its supports 17 and 18 and the rack is pivotally attached to the free end of a lever 23. Adjusting screws 24 in the branched end of lever 23 limits the pivotal movement of rack 21 as it is moved relative to pinion 22 by the swinging movement of lever 23. Lever 23 is held against the adjusting screw 25 of a stop 26 by the bias imparted thereto by coil spring 19 acting through the driving connection of the rack and pinion respectively attached to lever 23 and shaft 16.

The fixed end of lever 23 is free to rotate on a shaft 27 journaled in supports 28 and 29. Pedal 12 is attached to and rotates with this shaft. It has a toe portion which projects on one side of shaft 27 in the same direction as lever 23 and a cupped heel portion which projects on the other side of shaft 27. Toe pressure on pedal 12 rotates shaft 27 in a counterclockwise direction and moves lever 23 in the same direction away from its stop 26 through a disengageable connection. This connection comprises a driving member or dog 30 mounted on and rotatable with shaft 27, an arm 32 on lever 23 and an adjusting screw 31 one end of which is mounted in a laterally projecting arm of dog 30 and the other end of which engages arm 32 when counterclockwise rotation is imparted to dog 30 by movement of pedal 12. Screw 31 is so adjusted that a pin-like member 33 projecting radially from the right hand end of shaft 27 is located in an inoperative position relative to the operating member 34 of switch 11 and so that clockwise rotation imparted to shaft 27 by heel pressure on pedal 12 will bring the projecting end portion of member 33 into actuating engagement with the operating member 34 of switch 11. The weight of the toe portion of pedal 12 normally holds screw 31 against arm 32 of lever 23.

It is thus apparent that by applying toe pressure on pedal 12 rheostat 10 may be adjusted, and that by applying heel pressure to pedal 12 switch 11 may be operated and that both of these operations are selectively independent and mutually exclusive of one another. In the arrangement illustrated, coil spring 19 biases rheostat 10 to the all out position and positions member 33 relative to the operating member 34 of switch 11 so that the contacts of this switch are in their normal or open position.

Switch 11 is mounted on a supporter 35. This support is mounted on a base plate 36 as are the other supports and stop previously mentioned. Except for the pedal, the several parts above described may be, and preferably are, enclosed by a cover (not shown) which rests on and is attached to the base plate 36.

Rheostat 10 and switch 11 of the controller just described are in accordance with my invention connected in an exciting circuit of a dynamo-electric machine for rapidly increasing the current output of the machine or for decreasing it at will to desired values less than the normal value for which it has been adjusted. One way in which this controller may be connected in an excitation circuit of a dynamo-electric machine has been illustrated in Fig. 2.

The controller has been diagrammatically represented by its electrical elements, rheostat 10 and switch 11, enclosed within the dotted rectangle 37. Control member 14 of rheostat 10 has been illustrated as biased by spring 19 to the all out position and the contacts of switch 11 have been illustrated in their open position which they also assume by reason of the bias of spring 19 as has been pointed out above in describing the construction of the controller.

Rheostat 10 is connected in series with an adjustable impedance or rheostat 38 in circuit with the field exciting windings of the dynamo-electric machine 39. This machine has been illustrated as a split pole arc welding generator having the construction illustrated in United States Letters Patent No. 1,340,004, Sven R. Bergman, granted May 11, 1920, for Dynamo-electric machine. An adjustment of either of the rheostats 10 or 38 will control the exciting current flowing through the shunt field windings of the arc winding generator and thereby control its heat or current setting. Switch 11 which is connected in shunt to the series connected rheostats or impedances 38 and 10 controls the connection of these impedances in the field exciting circuit of generator 39, and thus also controls the current setting of this generator. A fixed or an adjustable impedance 40 may be connected in the shunt circuit of switch 11 in order to limit the amount of excitation which is applied to the welding generator when this switch is closed.

The normal current setting of the arc welding generator is determined by the adjustment of the set rheostat 38. If the operator finds that more heat and current are required he will apply heel pressure to the pedal 12 of the controller and thereby close the contacts of switch 11. The closure of these contacts by-passes the rheostats 10 and 38 and thereby applies to the arc welding generator full excitation reduced by the setting of rheostat 40. On the other hand, if the operator finds that less than normal current is required for the arc welding operation he is performing, he will depress the toe pedal 12 and insert a desired amount of resistor 10 which he finds suitable for obtaining the desired current value. At the end of a welding operation where the operator desires to eliminate crater formation, he will depress the toe of pedal 12 until all of resistor 10 has been inserted in the exciting circuit of the arc welding generator. Enough resistance is provided in rheostat 10 to reduce the welding current below any value which can be obtained by the set rheostat 38. It is thus possible by depressing the toe of pedal 12 to the limit of its travel to cause the voltage of the generator to fall so low that the arc will fade away and die out. If a constant arc length is held by the operator during this time, the heat generated in the arc will be reduced and at the same time cooling of the arc crater will take place at a rate depending on the rate of inserting resistor 10. As the arc becomes smaller, deposited metal is added to the crater over a smaller and smaller area, the result being that the crater can be almost completely filled by the time that the arc current is so low that the arc goes out. With such a foot operated controller, the operator has only to press the pedal rapidly or slowly as he desires to obtain a quick or slow change in the welding current. Moreover, it can be held constant at any point and then increased or decreased at will and at any rate desired. Such control is of very great value in preventing burn-through in places where the fit-up is poor or where thin sections of base material are encountered.

It is, of course, apparent that the arc welding generator must be operated under conditions requiring a certain amount of rheostat 38 to be inserted in its exciting circuit. Otherwise closure of the field forcing switch 11 would have no effect assuming of course that no part of rheostat 40 is inserted in circuit with switch 11. For example, as illustrated in the above referred to Bergman patent the number of series field turns may be controlled by a tap switch and by moving the tap switch to change the series turns, the shunt field rheostat may be adjusted to a lower value so that there is more resistance to be cut out by operation of the field forcing switch. In order to simplify the drawings, the tap switch for adjusting the series field winding has not been illustrated in Fig. 2.

In the controller shown in Figs 3 and 4 of the drawings, the adjustable field impedance 41 and field forcing switch 42 are selectively controlled by operating members 43 and 44. These members extend through the enclosing case 45 of the controller and are located on opposite sides of a foot support 46, also mounted on cover 45. The operator rests his foot on this support and by tilting it in opposite directions may selectively actuate either one of these operating members. The support 46 comprises a crossbar 47 whose ends are supported in brackets 48 located on the top of cover 45 intermediate the operating members 43 and 44 for impedance 41 and switch 42.

Switch 42 is attached to the inside of cover 45 as is the rheostat 41 and its operating shaft 49. This shaft is biased for rotation in one direction by a coil spring 50 one end of which is attached to the shaft and the other end of which is attached to the support for the shaft. The rotation of shaft 49 is controlled by a flexible strap 51, one end of which is attached to said shaft, and the other end of which is atached to the inside of the cover 45 by means of a member 52. One end portion of this strap is coiled about shaft 49 and the other end portion passes over and under pulleys 53 and 54. Pulley 53 is attached to the inside cover 45 and pulley 54 is mounted on an axle 55 in the forked lower end of the operating member 43. Movement of pulley 54 with operating member 43 is guided by a member 56 also attached to the inside of cover 45. Member 56 is provided with elongated guide slots 57 for the end portions of axle 55. The depression of operating member 43 controls the size of the loop formed in the uncoiled portion of the strap 51 and thereby imparts rotation to shaft 49 by controlling the amount of the strap coiled about this shaft by the bias imparted thereto by coil spring 50.

Cover 45 is mounted on and attached to base 58 which may be provided with a hook 59 so that the controller may be hung from a vertical support and thus be used as a hand controller. When so used it is of course apparent that one hand of the operator will be used in performing the welding operation and that the free hand may be used to actuate either of the operating members 43 or 44 of the control.

Instead of using the crossbar foot support shown in Figs. 3 and 4, a pedal 60 shown in Fig. 5 may be used. Otherwise the controller of Fig. 5 may have the same construction as illustrated in Figs. 3 and 4.

Under some circumstances, it may be desirable to selectively operate the field impedance and field force switch in response to translatory movement of the operator's foot. A control embodying a mechanical arrangement for accomplishing this result is illustrated in Fig. 6. The pedal 61 is adapted to slide along the inclined upper surface of the cover 62 of the controller. It is hinged to and connected at 63 to a bell crank lever 64 pivoted at 65 to the base 66 of the controller. Movement of the operator's foot to the left causes the body portion of lever 64 to operate switch 67 and movement of the operator's foot to the right causes the arm of this lever to move pulley 68 mounted thereon toward the dotted position illustrated in the figure. An operating strap 69 passing over a fixed pulley 70 and the movable pulley 68 is consequently withdrawn from the operating shaft 71 of adjustable impedance 72 against the bias of a coil spring 73. As in the embodiment shown in Figs. 3 and 4 one end of strap 69 is attached to the cover of the controller and the other end is attached to the operating shaft 71 of the adjustable impedance. The same is true of the coil spring 73.

In view of the description of the several controllers illustrated in the drawings, other arrangements will occur to those skilled in the art. It is also apparent that controls embodying my invention may be connected with other excitation control elements in manners other than that illustrated in Fig. 2 of the drawings. Furthermore the movable element of adjusable impedance 10 may be biased to a position in which some of this impedance is always connected in the excitation circuit of the generator or an additional fixed or adjustable impedance may be connected in series circuit with the adjustable impedances 38 and 10.

It is also apparent that my invention is not limited in its application to controlling the excitation of a generator but may also be used for controlling the excitation of a motor. It may also be used in other control arrangements for operating apparatus other than dynamo-electric machines. Various other controller arrangements and connections of its electric elements in control circuits will occur to those skilled in the art, and I intend consequently to cover by the appended claims all such modifications and variations which come within the true spirit and scope of my invention.

What I claim as new and desire to secure by Letters Patent of the United States, is:

1. Apparatus comprising an adjustable impedance, a switch, means for connecting said switch in shunt circuit with said impedance, an operating member biased to a predetermined position, and means for supporting said member for mutually exclusive operation of said adjustable impedance and said switch by movement thereof in zones extending in opposite directions from said predetermined position, movement of said member in one of said zones operating said switch and movement of said member in the other of said zones operating said adjustable impedance.

2. Apparatus comprising an adjustable impedance, a switch, an electric circuit, means including said switch for controlling the connection of said adjustable impedance in said circuit, an operating member, means for biasing said member to a predetermined position, and means for supporting said member for mutually exclusive operation of said adjustable impedance and said switch by movement thereof in zones extending in opposite directions from said predetermined position, movement of said member in one of said zones operating said switch and movement of said member in the other of said zones operating said adjustable impedance.

3. Apparatus comprising an adjustable impedance having its adjusting member biased to an all out position, a switch having its contacts biased to the open position, a second adjustable impedance, means for connecting said adjustable impedances in series with one another and for connecting said switch in shunt to said series connected impedances, and means for selectively operating exclusively of one another said switch and said adjusting member of said first mentioned impedance in response to movement of said operating member in zones of movement extending in opposite directions from a predetermined position in which said switch is in its open position and said adjusting member of said first mentioned adjustable impedance is biased to its all out position.

4. Apparatus comprising a plurality of adjustable impedances connected in series circuit with one another, one of said impedances having a control element biased to the all out position, a switch having contacts biased to the open position, another adjustable impedance, means for connecting said switch and said other adjustable impedance in series with one another and in shunt circuit across said series connected impedances, an operating member, and means for supporting said operating member for mutually exclusive operation of said switch and said one of said first mentioned adjustable impedances in response to movement thereof in zones extending in opposite directions from a predetermined position, movement of said operating member in one of said zones operating said control member of said one of said first mentioned adjustable impedances and movement of said control member in the other of said zones operating said switch.

5. Apparatus for controlling the excitation of a dynamo-electric machine comprising an adjustable impedance, a switch, a support about which heel and toe portions of an operator's foot resting thereon may be tilted in opposite directions, and means inoperative for one position of the operator's foot on said support but responsive to tilting movements of the operator's foot on either side of said position for selective and mutually exclusive operation of said impedance and said switch.

6. Apparatus comprising an electric circuit, an adjustable impedance in said circuit, a switch for controlling the connection of said impedance in said circuit, juxtaposed operating members for said adjustable impedance and said switch, and a support intermediate said operating members and about which the heel and toe portions of an operator's foot resting thereon may be tilted in opposite directions into selective and mutually exclusive engagement with either one of said operating members.

7. Apparatus comprising an adjustable impedance having a movable control member, means including a shaft for adjusting the position of said control member, means for biasing said shaft for rotation in one direction, a flexible strap having one end attached to said shaft, its other end attached to a support, and a portion thereof coiled about said shaft by reason of the rotation imparted thereto by said biasing means, means for forming and controlling the size of a loop in the uncoiled portion of said strap and thereby imparting rotation to said shaft by controlling the amount of said strap coiled about said shaft by said biasing means, a switch, means for connecting said switch in shunt circuit with said adjustable impedance, an operating member for said switch, and means including a support about which the heel and toe portions of an operator's foot resting thereon may be tilted in opposite directions for selective and mutually exclusive operation of said member of said switch and said loop forming and controlling means of said adjustable impedance.

8. Apparatus comprising an adjustable impedance having a movable control member, means including a shaft for adjusting the position of said control member, means for biasing said shaft for rotation in one direction, a flexible strap having one end attached to said shaft, its other end attached to a support, and a portion thereof coiled about said shaft by reason of the rotation imparted thereto by said biasing means, and means for forming and controlling the size of a loop in the uncoiled portion of said strap and thereby imparting rotation to said shaft by controlling the amount of said strap coiled about said shaft by said biasing means.

9. Apparatus for controlling the excitation of a dynamo-electric machine comprising an adjustable impedance, a switch, a support for said impedance and said switch, a pedal mounted for translatory movement on said support, and means inoperative for one position on said pedal but responsive to movement thereof on either side of said position for selectively operating said impedance and said switch.

10. A controller comprising an adjustable impedance having an operating member, a switch having an operating member, means including a pivotally supported lever for imparting motion to the operating member of said adjustable impedance, a stop for said lever, means for biasing said lever against said stop, a shaft, a dog attached to said shaft for rotation therewith, a disengageable connection between said dog and said lever which imparts rotation to said lever in one direction only away from said stop, a member attached to said shaft which imparts motion to said operating member of said switch upon rotation of said shaft in the opposite direction after said connection between said dog and said lever has been disengaged, and means for rotating said shaft in opposite directions.

11. A controller comprising an adjustable impedance having an operating member, a switch having an operating member, means including a pivotally supported lever for imparting motion to said operating member of said adjustable impedance, an adjustable stop for said lever, means for biasing said lever against said stop, a shaft, a dog attached to said shaft for rotation therewith, a disengageable connection between said dog and said lever which imparts rotation to said lever in one direction only away from said stop, means for adjusting said connection, a member attached to said shaft which imparts motion to said operating member of said switch upon rotation of said shaft in the opposite direction after said connection between said dog and said lever has been disengaged, and means including a pedal for rotating said shaft in opposite directions.

12. A controller comprising an adjustable impedance having an operating member, a switch having an operating member, means including a lever for imparting motion to the operating member of said adjustable impedance, a stop for said lever, means for biasing said lever against said stop, a pedal, a disengageable connection between said pedal and said lever which imparts rotation thereto in one direction only away from said stop, and means responsive to rotation of said pedal in the opposite direction for imparting motion to the operating member of said switch after said lever engages said stop and said connection between said pedal and said lever has been disengaged.

13. A controller comprising an adjustable impedance having an operating member, a switch having an operating member, means including a lever for imparting motion to the operating member of said adjustable impedance, an adjustable stop for said lever, means for biasing said lever against said stop, a pedal, a disengageable connection between said pedal and said lever which imparts rotation thereto in one direction only away from said stop, means for adjusting said connection, and means responsive to rotation of said pedal in the opposite direction for imparting motion to the operating member of said switch after said lever engages said stop and said connection between said pedal and said lever has been disengaged.

14. A controller comprising an adjustable impedance having relatively rotatable members, a support for one of said members, a rotatable shaft attached to the other of said members, means for biasing said shaft for rotation in one direction, a lever, a driving connection between said lever and said shaft, a second shaft on which said lever is free to rotate, a dog attached to said second shaft for rotation therewith, a pedal attached to said second shaft for imparting rotation thereto, a switch having an operating member, a support for said switch, a member attached to said second shaft and engaging said operating member of said switch upon rotation of said second shaft in a direction opposite to that in which a driving connection is established between said dog and said lever on said second shaft, and a stop against which said lever is held by said biasing means and the driving connection between said first mentioned shaft and said lever, said stop positioning said member on said second shaft out of engagement with said operating member of said switch due to the driving connection between said lever, said dog and said second shaft.

15. A controller comprising an adjustable impedance having relatively rotatable members, a support for one of said members, a rotatable shaft attached to the other of said members, a second rotatable shaft having one end adjacent the end of said first mentioned shaft, a plurality of supports in which said second mentioned shaft is journaled for rotation about its own longitudinal axis and the longitudinal axis of said first mentioned shaft, a flexible coupling between the adjacent ends of said shafts, a coil spring having one end attached to said second mentioned shaft and its other end held by a support, a lever, a driving connection between said lever and the portion of said second shaft intermediate its said supports, a third shaft on which said lever is free to rotate, a dog attached to said third shaft for rotation therewith, means for adjusting the driving connection between said dog and said lever, a pedal attached to said third shaft for imparting rotation thereto, a pair of support members in which said third shaft is journaled, a switch having an operating member, a support for said switch, a member attached to said third shaft and engaging said operating member of said switch upon rotation of said third shaft in a direction opposite to that in which a driving connection is established between said dog and said lever on said third shaft, an adjustable stop against which said lever is held by the bias imparted thereto by said spring and the driving connection between said second shaft and said lever, said stop positioning said member on said third shaft out of engagement with said operating member of said switch due to the driving connection between said lever, said dog and said third shaft, and a base on which said stop and said supports are mounted.

RICHARD F. WYER.